United States Patent [19]

Wakiya et al.

[11] Patent Number: 4,662,494

[45] Date of Patent: May 5, 1987

[54] AUTOMATIC TRANSMISSION SYSTEM FOR VEHICLES

[75] Inventors: Michio Wakiya; Hideyasu Takefuta; Hiromi Kono, all of Higashimatsuyama, Japan

[73] Assignee: Diesel Kiki Co., Ltd., Japan

[21] Appl. No.: 702,822

[22] Filed: Feb. 19, 1985

[30] Foreign Application Priority Data

Feb. 16, 1984 [JP] Japan ................... 59-26017

[51] Int. Cl.$^4$ ............................................. B60K 41/28
[52] U.S. Cl. ............................. 192/0.052; 192/0.076; 192/0.092; 192/103 R
[58] Field of Search ............. 192/103 R, 0.052, 0.092, 192/0.075, 0.076, 0.033, 0.08; 74/857

[56] References Cited

U.S. PATENT DOCUMENTS

| | | | |
|---|---|---|---|
| 2,539,649 | 1/1951 | Winther | 192/0.052 X |
| 2,788,872 | 4/1957 | Winther | 192/0.075 X |
| 3,273,679 | 9/1966 | Uher | 192/0.052 |
| 3,693,605 | 9/1972 | Hirozawa | 192/0.092 X |
| 4,194,608 | 3/1980 | Usui et al. | 192/0.092 |
| 4,481,843 | 11/1984 | Jarvis et al. | 192/0.052 X |
| 4,535,652 | 8/1984 | Nishikawa et al. | 192/0.092 X |

FOREIGN PATENT DOCUMENTS 1505402 4/1970 Fed. Rep. of Germany ... 192/0.052

Primary Examiner—George H. Krizmanich
Attorney, Agent, or Firm—Guy W. Shoup

[57] ABSTRACT

An automatic transmission system has a controllor for controlling the slip rate of a clutch in accordance with the amount of depression of an accelerator pedal instead of controlling the ON/OFF condition of the clutch by a control signal when it is discriminated that the gear change position of a transmission and the amount of depression of the accelerator pedal are in the predetermined states. In a predetermined condition, the slip rate of the clutch is adjusted in accordance with the amount of depression of the accelerator pedal so as to put the clutch in a semi-engaged condition, thereby enabling the speed of the vehicle to be controlled within a very low speed range simply by operation of the accelerator pedal.

11 Claims, 7 Drawing Figures

AUTOMATIC TRANSMISSION SYSTEM FOR VEHICLES

BACKGROUND OF THE INVENTION

1. Field of the Invention

The present invention relates to a speed-change-gear-type automatic transmission system for vehicles.

2. Description of the Prior Art

Recently, there are being put into practical use an increasing number of automatic transmission systems of the speed-change-gear type which, having actuators responsive to electric signals provided in association with the transmission and clutch, are capable of automatically carrying out start and gear change operations in accordance with parameters indicative of the operating condition of the vehicle, such as the amount of depression of the accelerator pedal.

Up to now the minimum speed at which a vehicle having an automatic transmission system of the type described above could be driven has been determined in all cases, other than when the clutch is disengaged or when the vehicle is being accelerated from rest, by the minimum engine speed and the speed reduction ratio of the lowest gear (e.g. first gear or reverse gear). Therefore, the minimum driving speed in first or reverse gear has normally been 3 to 5 km/h. Practically, however, it often becomes necessary to drive a vehicle at a slower speed than this minimum driving speed, as in the case where the vehicle is to be driven into a garage. In such a case, the driver usually depresses the brake pedal to cause the clutch to disengage, thus realizing the desired very low driving speed. This difficulty encountered by the driver in driving the vehicle at very low speeds has constituted a major disadvantage of speed-change-gear-type automatic transmission systems of the prior art.

SUMMARY OF THE INVENTION

It is therefore an object of the present invention to provide an improved speed-change-gear-type automatic transmission system for vehicles which is free from the above drawbacks.

It is another object of the present invention to provide a speed-change-gear-type automatic transmission system for vehicles which enables the car to be driven very slowly either forward or backward merely by operation of the accelerator pedal once the transmission has been put in the proper gear.

The automatic transmission system for vehicles according to the present invention has a friction clutch and a speed-change-gear-type transmission which are coupled to the vehicle engine and can be operated by actuators in accordance with electric signals and is characterized in that it comprises first detecting means for detecting the amount of depression of an accelerator pedal, second detecting means for detecting the gear shift position of the transmission, discriminating means for discriminating on the basis of the detections by the first and second detecting means whether or not the gear shift position and the amount of depression of the accelerator pedal have respectively assumed predetermined conditions, and control means for controlling the slip rate of the clutch in response to the amount of depression of the accelerator pedal detected by said first detecting means when the gear shift position and the amount of depression of the accelerator pedal have assumed the predetermined conditions.

With this construction, when the transmission is in a low gear (first or reverse) and the amount of accelerator pedal depression is in a predetermined range, the slip rate of the clutch is adjusted in accordance with the amount of depression of the accelerator pedal so as to put the clutch in a semi-engaged condition, thereby enabling the speed of the vehicle to be controlled within a very low speed range simply by operation of the accelerator pedal and providing a pronounced improvement in the operability of the vehicle as when driving it into a garage.

These and other objects, advantages and features of the present invention will become apparent from the detailed description of the embodiments with reference to the accompanying drawings.

DESCRIPTION OF THE PREFERRED EMBODIMENTS

Figure 1:
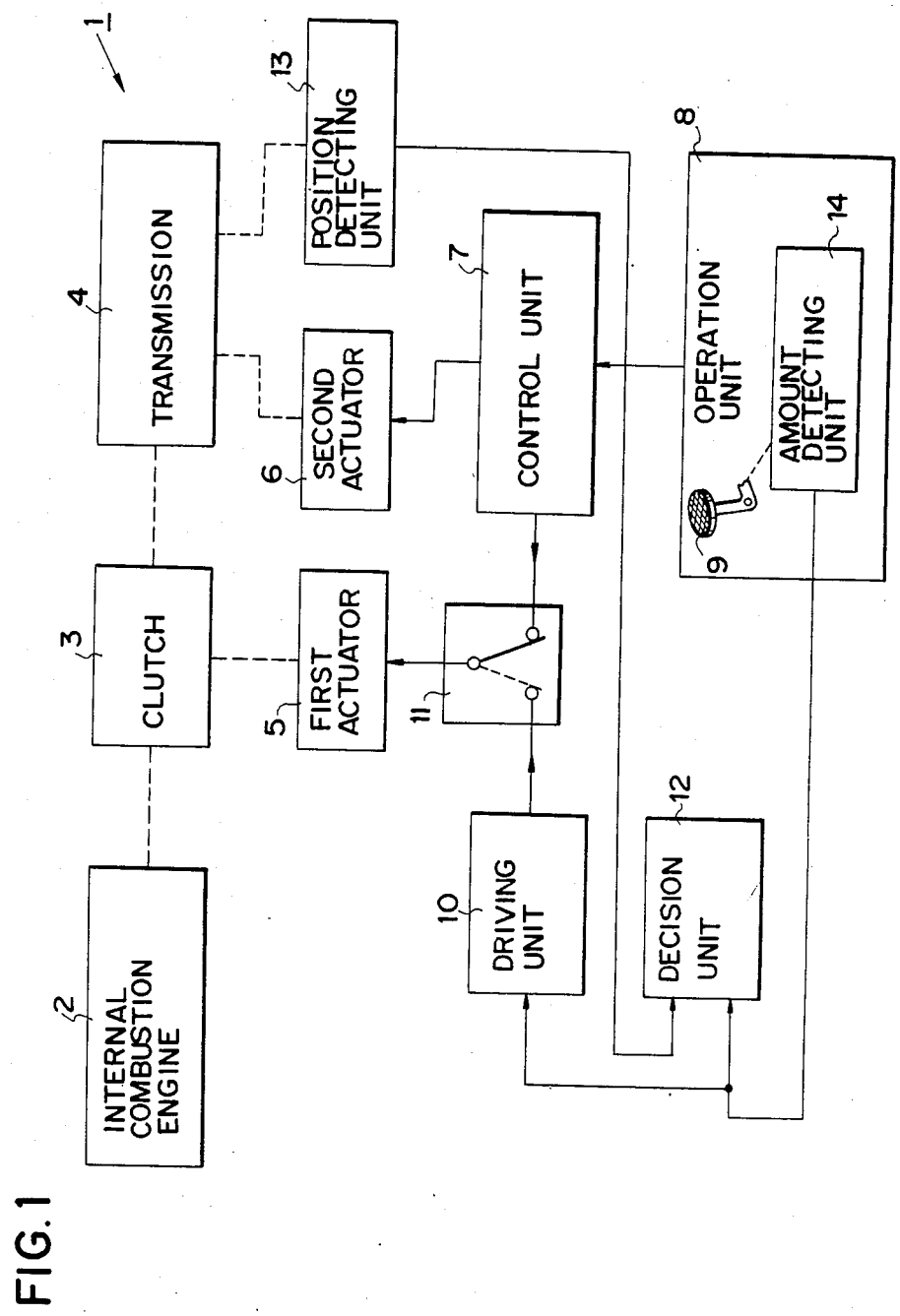
FIG. 1 is a block diagram schematically showing the basic concept of the present invention.

Referring to FIG. 1 showing a block diagram of the basic construction of the present invention, the automatic transmission system 1 for vehicles comprises a friction clutch 3 and a speed-change-gear-type transmission 4 coupled to an internal combustion engine 2 of either the autoignition type or the assisted ignition type. To the clutch 3 and the transmission 4 there are connected a first actuator 5 and a second actuator 6, respectively. A control unit 7 supplied with information indicative of the operating conditions of the vehicle at each instant from an operation unit 8 carries out the calculations required for controlling the gear shift operations on the basis of the information from the operation unit 8 and drives the first and second actuators 5 and 6 in accordance with the result of the calculations.

The automatic transmission system 1 further comprises a switch 11 which is controlled by a decision unit 12 to switch the mode of control of the clutch 3 from that by the control unit 7 during ordinary driving to that by a driving unit 10 when the transmission 4 is in a predetermined low speed position and at the same time the amount of depression of an accelerator pedal 9 is within a predetermined range. The decision unit 12 makes a decision regarding the control mode to which the switch 11 is to be switched on the basis of the output from a position detecting unit 13 for detecting the gear shift position and the output from an amount detecting unit 14 for detecting the amount of depression of the accelerator pedal 9. Specifically, the decision unit 12 changes the switch 11 from the position indicated by the full line to the condition indicated by the broken line when the transmission 4 is in a predetermined low gear and the amount of depression of the accelerator pedal 9 is within a predetermined range.

The driving unit 10 is responsive to the output from the amount detecting unit 14 and controls the first actuator 5 so as to change the slip rate of the clutch 3 in accordance with the amount of depression the accelerator pedal 9.

According to the structure of described above, when the transmission 4 is in a low speed gear such as first or reverse gear, the slip rate of the clutch 3 can be changed by regulating the depression of the accelerator pedal 9 within the prescribed range, thereby enabling the driver to drive the vehicle at a desired very low speed.

Figure 2:
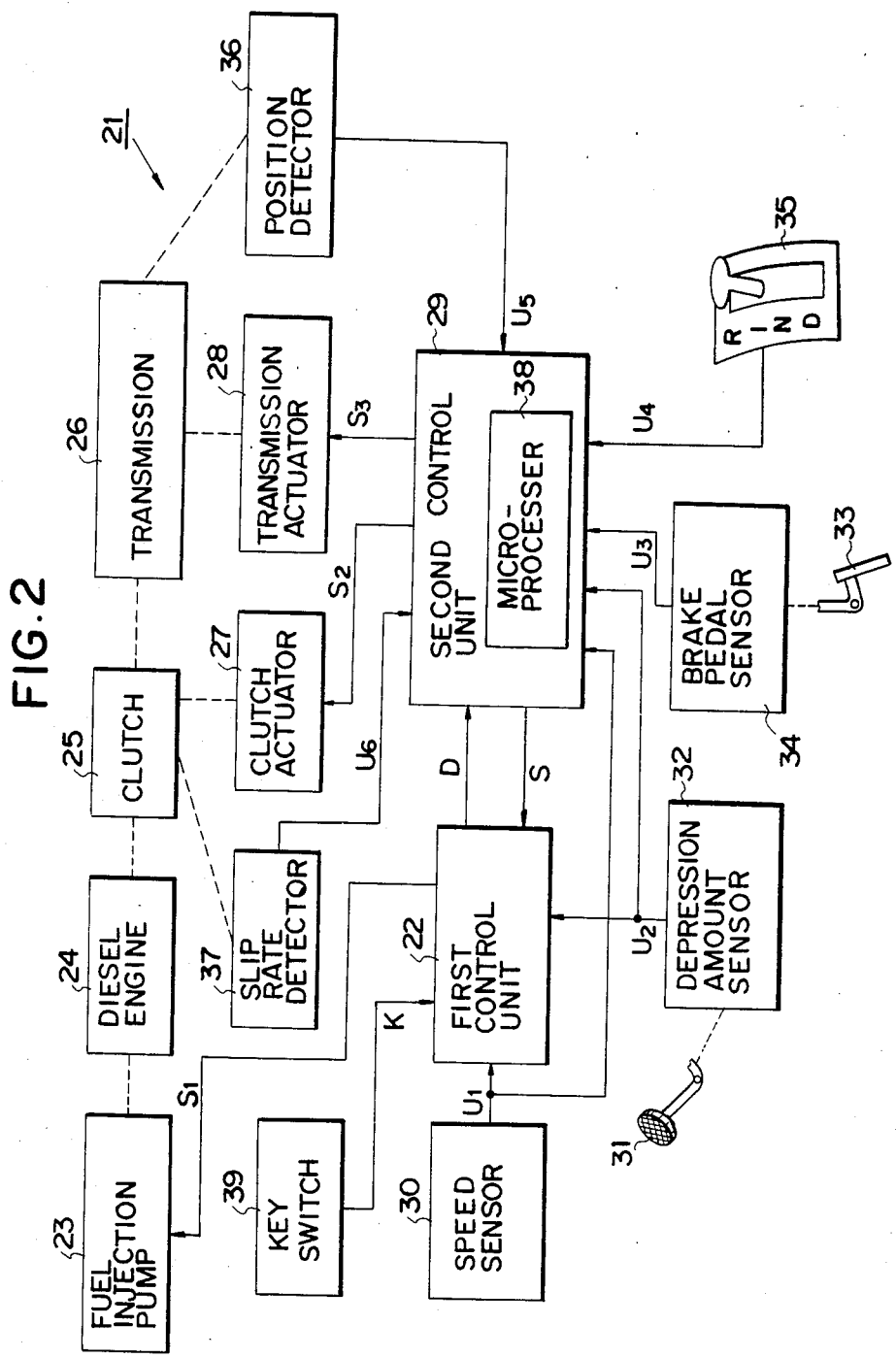
FIG. 2 is a block diagram of one embodiment of the automatic transmission system for vehicles according to the present invention.

Now, a detailed description of a more elaborate embodiment of the automatic transmission system for vehicles according to the present invention will be made with reference to FIG. 2. The automatic transmission system 21 comprises a clutch 25 coupled to a diesel engine 24 having a fuel injection pump 23 for controlling the amount of fuel injection in accordance with a first control signal S1 from a first control unit 22, and a speed-change-gear-type transmission 26 coupled to the clutch 25. A clutch actuator 27 and a transmission actuator 28 are connected to the clutch 25 and the transmission 26, respectively, and are controlled by second and third control signals S2 and S3 from a second control unit 29.

The automatic transmission system 21 further comprises a speed sensor 30 for producing a speed signal U1 indicative of speed N of the diesel engine 24, depression amount sensor 32 which detects the amount of depression of an accelerator pedal 31 and which produces an accelerator signal U2 indicative of the amount of depression of the accelerator pedal 31, a brake pedal sensor 34 for producing a brake signal U3 in response to the operation of a brake pedal 33, a gear selector 35 for producing a command signal U4, a position detector 36 for producing a position signal U5 indicative of the gear position at each instant, and a slip rate detector 37 for producing a slip rate signal U6 indicative of the slip rate of the clutch 25.

To the second control unit 29 there are applied the speed signal U1, the accelerator signal U2, the brake signal U3, the command signal U4, the position signal U5 and the slip rate signal U6, and predetermined control calculations are executed by a microprocessor 38 in the second control unit 29 on the basis of these signals. The control operations include one for changing gears and one for controlling the semi-engagement of the clutch 25 so as to enable very low speed driving under predetermined conditions.

On the other hand, the control operation for governing the speed N of the diesel engine 24 in response to the speed signal U1 and the accelerator signal U2 is carried out in the first control unit 22. The control operation for the governing operation is performed in accordance with a predetermined minimum-maximum speed governor characteristic when normal gear changing operation is being carried out in the second control unit 29, while the control operation is performed in accordance with an all-speed governor characteristic when the very low speed control operation is being executed in the second control unit 29.

A status signal S indicating which operation is being executed in the second control unit 29 is applied to the first control unit 22 by the second control unit 29. As a result, in the first control unit 22, the switch-over between the two types of governor characteristics described above is performed in accordance with the status signal S. In addition, a signal K indicative of the condition of a key switch 39 is applied to the first control unit 22 and data D indicative of the condition of the operation of the diesel engine 24 is applied from the first control unit 22 to the second control unit 29.

Figure 3:
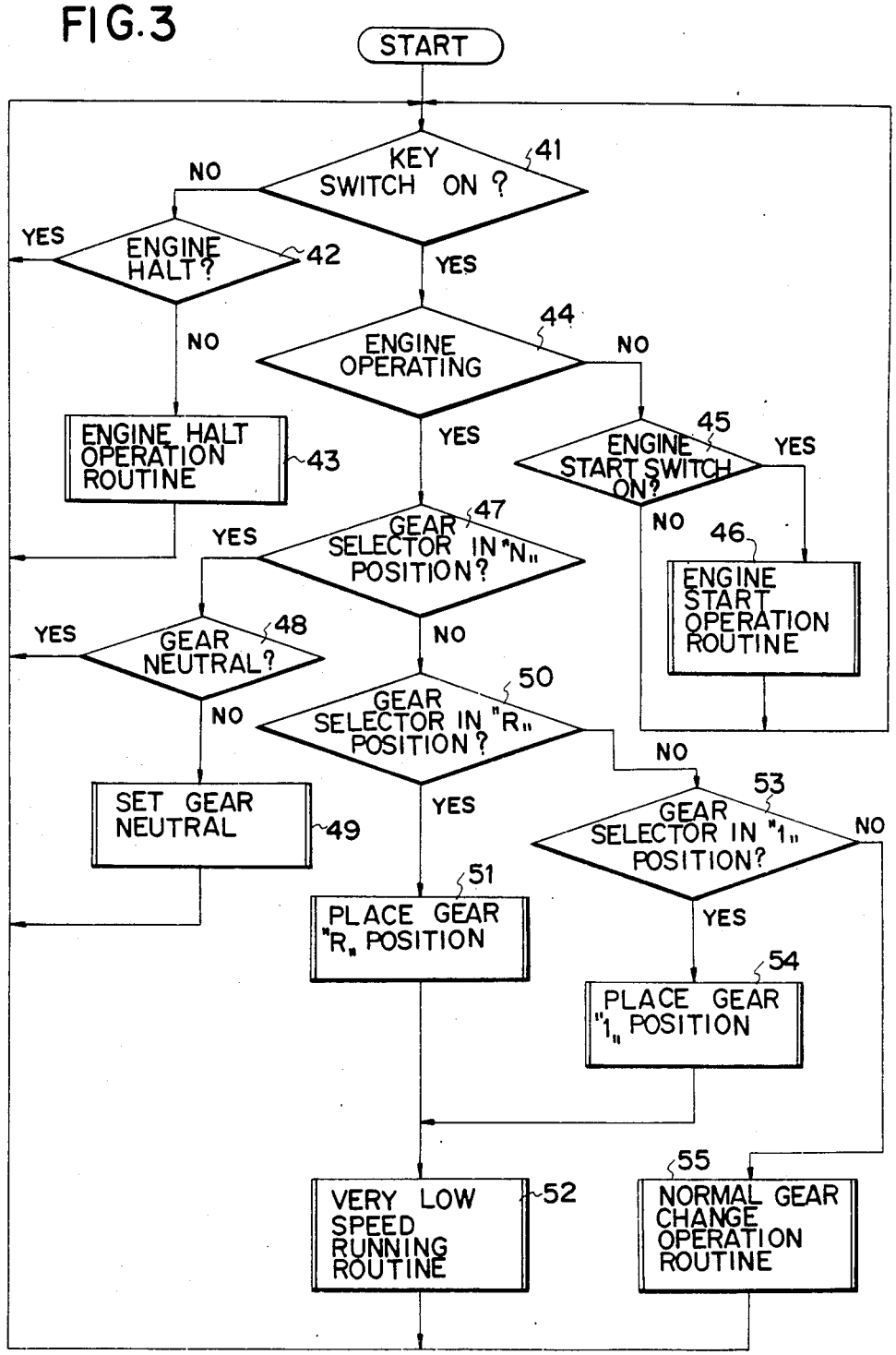
FIGS. 3 and 4 are charts representing control programs to be executed in the second control unit in the transmission system shown in FIG. 2.

The controlling operation by the second control unit 29 will now be described with reference to the program flow chart shown in FIG. 3.

When the program is started, a first decision is made in step 41 on the basis of data D from the first control unit 22 indicative of the condition of the operation of the diesel engine 24 as to whether the key switch 39 is ON. If the decision in step 41 is NO, the operation moves to step 42, where a decision is made as to whether the engine 24 is in the hald condition. If the decision in step 42 is YES, the operation returns to step 41. However, if the result of the decision in step 42 is NO, the operation moves to step 43, where an engine halt processing routine is executed when the engine is operating and the engine is stopped in this step. The operation then returns to step 41.

In step 44, a decision is made as to whether the engine is operating in the case where the key- switch 39 is the ON condition. If the decision in step 44 is NO, i.e., the engine is in the halt condition, a decision is made as to whether an engine start switch (not shown) is in the ON condition in step 45. If the decision in step 45 is NO, the operation returns to step 41. On the other hand, if the decision in step 45 is YES, the engine start operation routine 46 is executed and then the operation returns to step 41.

When the key switch 39 is ON and the engine is running, the position of the gear selector 35 is discriminated in step 47 and if the decision in step 47 is that the gear selector 35 is in the neutral position "N", the decision in step 47 becomes YES and the operation now moves to step 48, where a decision is made as to whether the transmission 26 is in neutral. If the decision in step 48 is YES, the operation returns to step 41. However, if the decision in step 48 is NO, i.e., the transmission 26 is not in the neutral, the operation moves to step 49, where the transmission is put in neutral. Then the operation returns to step 41.

If the gear selector 35 is not in the neutral position "N", the decision in step 47 becomes NO and the operation moves to step 50, where a decision is made as to whether the gear selector 35 is in reverse position "R". If the decision in step 50 is YES, the operation moves to step 51, where the gear changing operation is carried out in response to the second and third control signals S2 and S3 to put the transmission 26 in reverse. The operation then moves to step 52, where the very low speed running routine is executed.

However, if the decision is NO in step 50, the operation moves to step 53, where a decision is made as to whether the gear selector 35 is in the first gear position "1". If the decision in step 53 is YES, the gear change operation for shifting to the first gear is executed in step 54 and the very low speed running routine is executed. If the decision in step 53 is NO, the operation moves to step 55, where the routine for normal gear changing operation is executed so as to shift the gear changing lever (not shown) in the transmission 26. After the execution of step 52 or 55, the program returns to step 41.

Figure 4:
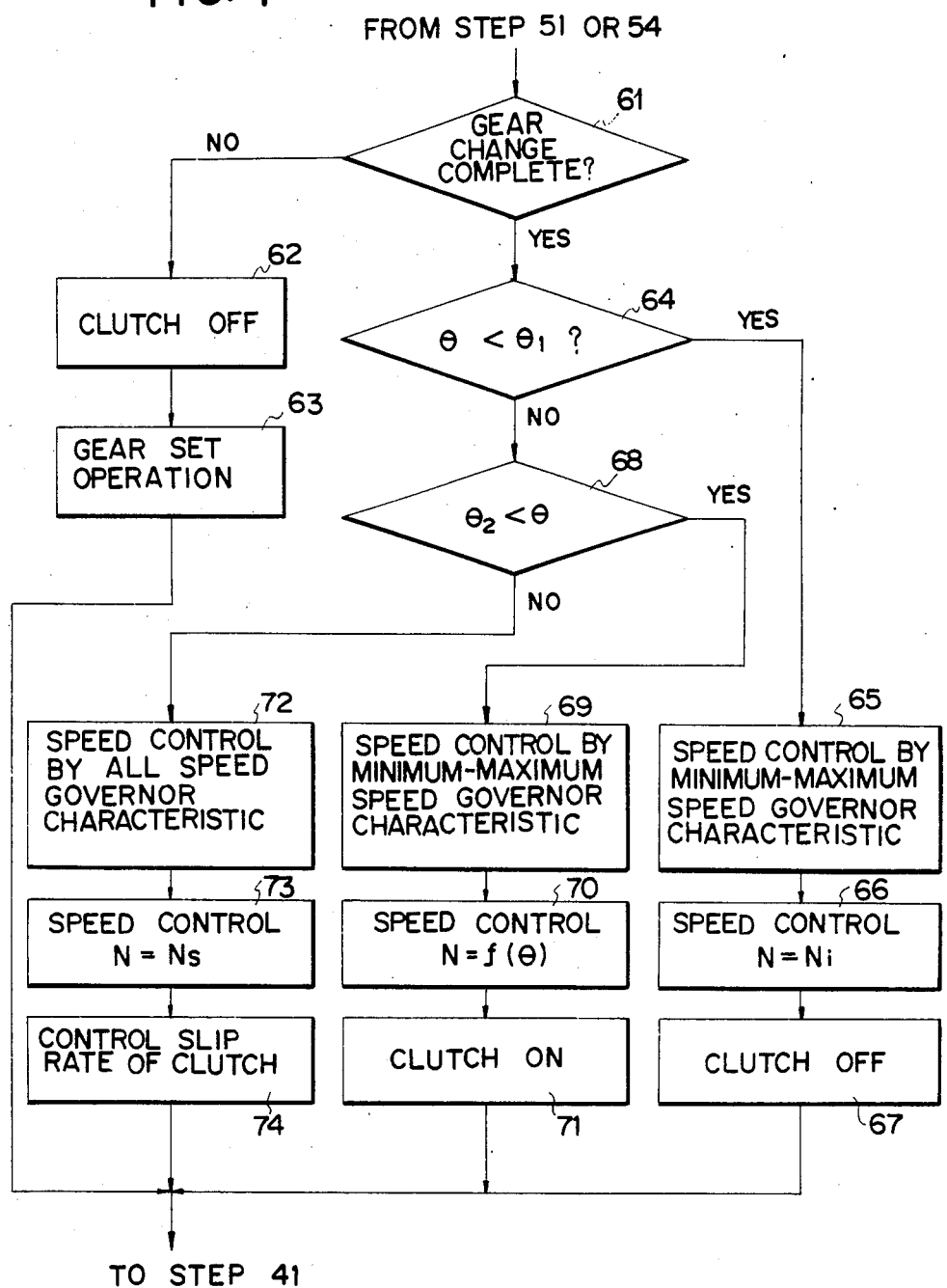

FIG. 4 shows a detailed flow chart of the very low speed running routine. In this routine, a decision is first made in step 61 as to whether the required gear change operation has been completed. If the decision in step 61 is NO, the operation moves to step 62, where the clutch 25 is disengaged (clutch OFF) and then the operation moves to step 63, where the gear set operation is carried out. After this operation, the program returns to step 41. On the other hand, however, if the decision in step 61 is YES, the operation moves to step 64, where a decision is made as to whether the amount $\theta$ of depression of the accelerator pedal is smaller than a predetermined value $\theta 1$. If the result of the decision in step is $\theta < \theta 1$, the operation moves to step 65, where the governing operation carried out by the first control unit 22 is changed to that according to the minimum-maximum speed governor characteristic, in which mode the governor operation is carried out only for the engine idling speed and the maximum engine speed and the engine speed region inbetween is controlled in accordance with the amount of depression of the accelerator pedal.

After this, in step 66, the first unit 22 is commanded to regulate the engine speed N to a predetermined idle speed Ni. After this operation, the program moves to step 67, where the clutch 25 is disengaged and the operation returns to step 41. As will be understood from the above description, the second control unit 29 interprets the fact that $\theta$ has become less than $\theta 1$ as meaning that the vehicle is to be stopped. Therefore, $\theta 1$ may be defined as zero depression of the accelerator pedal 31.

If the decision is step 64 is NO, that is $\theta \geq \theta 1$ is found, the operation moves to step 68, where a decision is made as to whether the amount $\theta$ of depression of the accelerator pedal 31 is larger than $\theta 2$ ($>\theta 1$). If the decision in step 68 is $\theta > \theta 2$, the governing operation carried out by the first control unit 22 is changed to that by the minimum-maximum speed governor characteristic and the first control unit 22 is switched to a mode for controlling the engine speed N in accordance with the amount of depression of the accelerator pedal 31 in step 70. Following this, the clutch 25 is engaged in step 71 and the operation returns to step 41.

On the other hand, when the decision in step 68 is NO, namely, $\theta 1 \leq \theta \leq \theta 2$ is found, the governing carried out by the first control unit 22 is switched to that by the all-speed governor characteristic in step 72, and the engine speed N is maintained at a predetermined speed Ns which is slightly higher than the engine idle speed Ni (step 73). After this operation, the program now moves to step 74, where the slip rate of the clutch 25 is controlled in accordance with the amount $\theta$ of depression of the accelerator pedal 31. The slip rate of the clutch 25 is controlled successively from 1 to 0 (i.e. from 100% slipping state to 0% slipping state) in accordance with the change in $\theta$ from $\theta 1$ to $\theta 2$. As a result, when the transmission 26 has been shifted to first or reverse gear, the slip rate of the clutch 25 can be successively changed alone in accordance with the amount of depression of the accelerator pedal 31 between $\theta 1$ and $\theta 2$ while the engine speed is maintained constant, thus enabling the vehicle to move forward or backward at very low speed.

Figure 5:
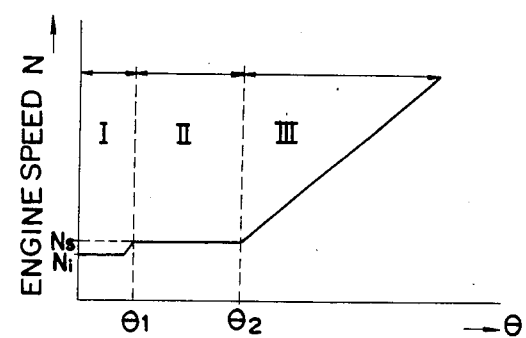
FIGS. 5 through 7 show characteristic curves for explaining the operation of the system shown in FIG. 2.
Figure 6:
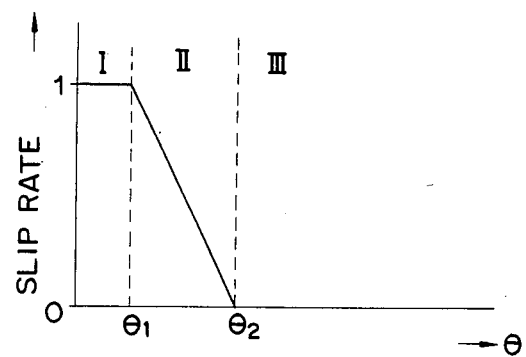
Figure 7:
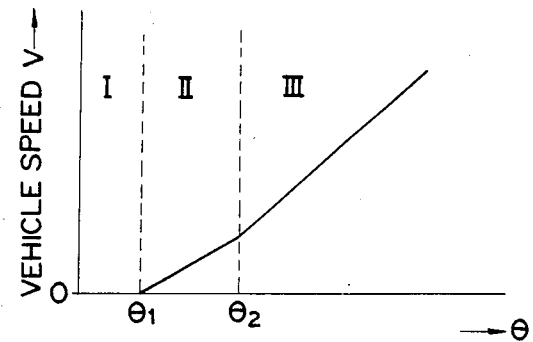

Now, the control of the engine speed, the clutch and the car speed in accordance with the very low speed running routine shown in FIG. 4 will be described with reference to FIGS. 5 through 7. In FIGS. 5 through 7, the transversal or X-axis indicates the amount $\theta$ of depression of the accelerator pedal 31, and in the following description, the area within the range of $\theta < \theta 1$ is referred to as "area I", the area of $\theta 1 \leq \theta \leq \theta 2$ is referred to as "area II", and the area of $\theta \geq \theta 2$ as "area III".

Referring to FIG. 5, when $\theta$, i.e. the amount of depression of the accelerator pedal 31, is in area I, the engine speed N is controlled in accordance with the minimum-maximum speed governor characteristic and is maintained at a predetermined idling speed Ni, while when $\theta$ is in area II, the engine speed N is controlled in accordance with the all-speed governor characteristic and is maintained at a predetermined rotating speed Ns.

The rotating speed Ns is determined as required for very low speed running. In the present embodiment, it is preset to be slightly higher than the idling speed Ni. When $\theta$ is in area II, the diesel engine 24 is controlled by the minimum-maximum speed governor characteristic and the engine speed N is controlled so as to be changeable in accordance with $\theta$.

On the other hand, the slip rate of the clutch 25 is 1 (i.e. clutch OFF) in area I, and is 0 (i.e. clutch ON) in area III, while in area II the slip rate decreases in direct proportion to increasing $\theta$, as shown in FIG. 6.

Accordingly, the vehicle speed V becomes zero in area I because of the complete disengagement of the clutch 25, increases slowly in the area II in accordance with increasing depression of the accelerator pedal 31 (increasing $\theta$) and returns to the condition of being governed by the predetermined minimum-maximum speed governor characteristic in the area II in accordance with $\theta$.

In the manner as described above, when the transmission 26 is in first or reverse gear and the amount $\theta$ of depression of the accelerator pedal 31 is in the area II, the clutch 25 is placed in a semi-engaged condition and the slip rate thereof is adjusted in accordance with the operation of the accelerator pedal 31. As a result, solely by operation of the accelerator pedal 31 it is possible to drive the vehicle at a desired very low speed, thus strikingly improving the operability of the car as when driving it into a garage.

Moreover, according to this embodiment of the present invention, the speed regulating characteristics are changed over so that the speed of the engine is controlled according to the all-speed governor characteristic in the area II, making it easy to maintain the engine speed at a predetermined constant speed. However, it is apparent that the present invention is not limited to the above embodiment and that other speed regulating characteristics may be used.

In addition, the engine speed in the area II need not necessarily be maintained at a constant speed insofar as the desired very low speed driving can be smoothly performed by the adjustment of the slip rate of the clutch 25.

In the foregoing embodiment, the description was made with respect to a vehicle utilizing a diesel engine. However, it is apparent that the present invention is not limited to an automatic transmission system for vehicles having diesel engines but is also applicable to vehicles having gasoline engines.

As described in the foregoing, in the automatic transmission system according to the present invention, desired very low speed driving can be performed by the mere operation of the accelerator pedal when the transmission is shifted to a predetermined low speed gear, thus remarkably improving the operability of the vehicle when the vehicle is driven at a very slow speed in a low speed gear position, as in the case of driving it into a garage.

We claim:

1. An automatic transmission system for vehicles having a friction clutch coupled to an internal combustion engine, a speed-change-gear type transmission coupled to said clutch, a first actuator for operating said clutch in response to an electric signal, a second actuator for operating said transmission in response to an electric signal, and means for producing first and second control signals for controlling the operations of said clutch by ON/OFF conditions and of said transmission by gear change positions, respectively, in response to a command signal from an operating unit, said system comprising:

a first detecting means for detecting the amount of depression of an accelerator pedal;

a second detecting means for detecting the gear change position of said transmission;

a decision means responsive to the outputs of said first and second detecting means for discriminating whether or not the amount of depression of the accelerator pedal is below a predetermined amount of depression and the gear change position of said transmission is in either the first or reverse gear position; and a first control means for controlling the slip rate of said clutch in accordance with the amount of depression of the accelerator pedal in order to allow very low speed vehicle operation, instead of controlling the ON/OFF condition of said clutch by said first control signal, when it is discriminated that the amount of depression of the accelerator pedal is below the predetermined amount of depression and the gear change position of said transmission is in either the first or reverse gear position.

2. A system as claimed in claim 1 wherein said first control means has means for producing a third control signal for controlling the slip rate of said clutch in response to the output of said first detecting means and a selecting means for selectively supplying either said first or third control signal to said first actuator in accordance with the output of said decision means.

3. A system as claimed in claim 1 wherein said decision means has a first discriminating means repsonsive to the output of said second detecting means for discriminating whether or not the gear change position of said transmission is in the first or reverse position, a second discriminating means repsonsive to the output of said first detecting means for discriminating whether or not the amount of depression of the accelerator pedal is below the predetermined amount of depression, and a third discriminating means repsonsive to the outputs of said first and second discriminating means for discriminating whether or not the amount of depression of the accelerator pedal is below the predetermined amount of depression and the gear change position of said transmission is in either the first or reverse position.

4. A system as claimed in claim 1 wherein said decision means has a first discriminating means responsive to the output of said second detecting means for discriminating whether or not the gear change position of said transmission is in first or reverse position and a second discriminating means responsive to the output of said first detecting means for discriminating whether or not the amount of depression of the accelerator pedal is within a predetermined range in the region of relatively small amount of depression, this discrimination by the second discriminating means being made after it is discriminated that the gear change position is in either the first position or the reverse position by said first discriminating means, whereby it is discriminated whether or not the amount of depression of the accelerator pedal and the gear change position of said transmission are in the predetermined states.

5. A system as claimed in claim 1 wherein the speed of said internal combustion engine is maintained at a predetermined speed slightly higher than the idling speed when the amount of depression of the accelerator pedal and the gear change position of said transmission are determined to be in the predetermined states by said discriminating means.

6. A system as claimed in claim 3, further comprising means for discriminating whether or not said internal combustion engine is running and the discriminating operations by the first and second discriminating means are carried out only when the running of said internal combustion engine is detected.

7. A system as claimed in claim 1 wherein said internal combustion engine is a diesel engine.

8. A system as claimed in claim 7, further comprising a second control means for controlling the engine speed in relation to the amount of depression of the accelerator pedal.

9. A system as claimed in claim 8 wherein said second cotrol means is switched over to carry out speed control according to a minimum-maximum governor mode, in which the governor operation is carried out only for an engine idling speed and a maximum engine speed and the engine speed region inbetween is controlled in accordance with the amount of depression of the accelerator pedal, when the slip rate of the clutch is controlled in accordance with the amount of depression of the accelerator pedal by means of said first control means.

10. A system as claimed in claim 9 wherein the slip rate of the clutch is proportional to the amount of depression of the accelerator pedal.

11. A system as claimed in claim 2 wherein said discriminating means has a first discriminating means responsive to the output of said second detecting means for discriminating whether or not the gear change position of said transmission is in first or reverse position and a second discriminating means responsive to the output of said first detecting means for descriminating whether or not the amount of depression of the accelerator pedal is within a predetermined range in the region of relatively small amount of depression, this discrimination by the second discriminating means being made after it is discriminated that the gear change position is in either the first position or the reverse position by said first discriminating means, whereby it is discriminated whether or not the amount of depression of the accelerator pedal and the gear change position of said transmission are in the predetermined states.

* * * * *